United States Patent
Hall et al.

(10) Patent No.: US 6,577,419 B1
(45) Date of Patent: *Jun. 10, 2003

(54) OPTICAL-FREQUENCY COMMUNICATIONS SYSTEM FOR AIRCRAFT

(76) Inventors: Christopher J. Hall, 424 Bridgetown Ct., Satellite Beach, FL (US) 32937; Clay S. Turner, 130 Jade Cove Dr., Roswell, GA (US) 30075; Jimmy C. Ray, 3355 Juanita Dr., Denison, TX (US) 75020

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,986

(22) Filed: Dec. 18, 1998

(51) Int. Cl.7 .............................................. H04B 10/00
(52) U.S. Cl. ...................................... 359/145; 359/152
(58) Field of Search .................. 359/145, 152, 359/172, 148, 157

(56) References Cited

U.S. PATENT DOCUMENTS

| | | | | |
|---|---|---|---|---|
| 4,977,619 A | * | 12/1990 | Crimmins | 455/607 |
| 5,359,446 A | * | 10/1994 | Johnson et al. | 359/152 |
| 5,880,867 A | * | 3/1999 | Ronald | 359/152 |
| 5,913,163 A | * | 6/1999 | Johansson | 455/426 |
| 5,969,837 A | * | 10/1999 | Farber et al. | 359/132 |
| 5,970,395 A | * | 10/1999 | Weiler et al. | 455/67.3 |
| 5,999,294 A | * | 12/1999 | Petsko | 359/145 |
| 6,055,425 A | * | 4/2000 | Sinivaara | 455/431 |

* cited by examiner

Primary Examiner—Leslie Pascal
Assistant Examiner—Dalzid Singh
(74) Attorney, Agent, or Firm—John L. DeAngelis, Jr.; Beusse Brownlee Bowdoin & Walter, P.A

(57) ABSTRACT

A communications system for aircraft includes an on-board network using optical frequencies for communications within the aircraft; the network includes personal communications devices and/or other devices such as personal computers communicating via optical ports at infrared or other optical frequencies. Capability of such devices to emit radio-frequency radiation is automatically blocked on sensing the infrared system. The various optical ports are connected to each other and to a controller which includes an interface between the on-board infrared portion of the system and radio-frequency transceivers; the transceivers connect to RF antennas for communication with stations outside the aircraft.

37 Claims, 1 Drawing Sheet

OPTICAL-FREQUENCY COMMUNICATIONS SYSTEM FOR AIRCRAFT

CROSS REFERENCE TO RELATED APPLICATIONS

Not applicable.

BACKGROUND OF THE INVENTION

1. Field of the Invention

This invention relates to aircraft communications systems for voice and/or data, and in particular to such systems using optical frequencies for communication aboard the aircraft and radio frequencies for external communications.

2. Description of the Related Art

Every experienced traveler is aware of the prohibition aboard airliners of devices such as personal telephone handsets which emit energy at radio frequencies. During critical periods of the flight such as take-off and landing, the ban is expanded to include all electronic equipment, including lap-top computers. The reason for the ban is that stray radio-frequency (RF) emissions from such equipment might interfere with electronic systems which control or aid in the navigation of the aircraft.

Personal telephone handsets, which include cellular and PCS telephones, personal digital assistants (PDAs), and similar devices which emit RF signals for communications, cannot be used at anytime during flight because they emit RF radiation that may interfere with flight systems or with ground-based mobile telephone services. The frequencies involved may vary in countries other than the United States, but the problem remains the same; the aircraft navigation system and other systems can be affected by these frequencies or by intermodulation products of these frequencies with others.

Many travelers are professionals who need to make efficient use of their time, including travel time spent aboard aircraft. The ability to use their personal communications devices for voice, data, FAX, etc. aboard airliners would be a welcome advance. A need exists, therefore, for a system which will allow the use of personal electronic communications equipment aboard aircraft, without danger of interference with the aircraft's on-board systems.

SUMMARY OF THE INVENTION

This invention is a communications system that permits the use of personal telephone handsets and other communications devices aboard passenger-carrying airliners and other aircraft. The invention uses an infrared (or other optical-frequency) communications network within the aircraft; voice and/or data signal traffic in the on-board system is managed by a controller/router. The controller/router is also an interface between the on-board system and transceivers connected to antennas. Communications with stations outside the aircraft includes sending RF signals to and from transmit/receive antennas. Remote stations with which the system antennas can communicate include satellites, other aircraft, and ground stations.

Recently manufactured computers and other electronic devices include infrared ports for transmitting and receiving signals at optical frequencies. This infrared capability is typically used for computer networking and data transfer. Many cellular and PCS (Personal Communications System) telephone handsets have infrared ports to replace the usual serial interface cable connection to computers for data transfer; this feature is increasingly common in newer equipment, and in some cases it allows the portable telephone to act as a sort of "wireless modem" for the computing device.

In this invention, infrared ports on the aircraft are linked to external radio-frequency (RF) antenna(s) for voice calls, facsimile transmissions, electronic mail, internet connections, data transfer, and other communications with stations outside the aircraft. In addition, intra-aircraft communications (between stations on board the aircraft) use the same system for circuit-switched (dial-up) or connectionless (packet) transfer of data aboard the aircraft. The same optical ports are used for intra-aircraft communications and for calls to or from stations outside the aircraft.

As outlined above, the system allows the shared use of communication resources by an aircraft crew and its passengers. Aircraft routing, navigation, weather, and telemetry services may use the same channels that the passengers use for voice, FAX, and data transmissions. These categories of transmissions include multi-media transmissions such as pictures, voice clips, etc. Allocation of channels is handled by the controller/router which gives priority to communications related to flight safety. In case of an in-flight problem or other contingency, the controller/router is able to disconnect a passenger's call in order to free channels needed for emergency communication.

Where passengers use their own telephones, billing for the calls or services may be processed in the usual manner; that is, such charges would appear on the passenger's individual billing statement. Another feature of the infrared system is that the need for permanently-installed telephones on aircraft is reduced considerably. Because passengers are able to use their own cellular telephones (in an optical mode) the permanent telephone installations can be reduced to a few "public" stations. These stations would be available to any of the passengers, and are analogous to pay telephones in a terrestrial telephone system. Potential advantages of having fewer permanent telephone installations include reduced aircraft maintenance costs and lower installed system weight with concomitant savings in fuel.

With current on-board communications systems, flight crew moving about an aircraft's passenger cabin are out of touch with the cockpit unless they are at a fixed intercom station. The infrared system allows members of the flight crew who are not in the cockpit to carry a small transceiver on their belts or elsewhere; their standard headset plugs into the transceiver. Alternatively, the transceiver is incorporated into the headset, or the transceiver may be configured as a "walkie-talkie" device. If, during an in-flight emergency (or a non-emergency situation), a crew member needed to go into the passenger cabin to visually inspect some aspect of the aircraft such as the trailing edge of the wing, voice contact can be maintained with the cockpit all the while. The crew member can also be in real-time contact with personnel on the ground. Similarly, flight attendants may contact each other or the flight crew, as desired. Such links use the IR system aboard the aircraft and RF transmission via external antennas, as appropriate.

Another feature of the on-board network is the capability to transmit entertainment audio, such as the sound tracks of in-flight movies, to individual headsets worn by passengers. Such transmission uses optical frequencies to "broadcast" one or more audio channels via the optical ports, eliminating the need for passengers to wear a plugged-in headset.

Based on the above, it is an object of this invention to provide, for use within aircraft, a communications system which uses optical frequencies rather than radio frequencies.

Another object is to increase the safety of air travel by eliminating potential sources of radio-frequency interference with an aircraft's electronic instruments and systems.

A further object is to provide a system by which flight-recorder data and aircraft performance data may be transmitted from an aircraft to a ground station.

Another object is to provide a system for wireless communications within an aircraft, including communications between members of the flight crew.

The specific nature of the invention, as well as other objects, uses, and advantages thereof, will clearly appear from the following description and from the accompanying drawing, the different views of which are not necessarily scale drawings.

CATALOG OF THE ELEMENTS

Figure 1:
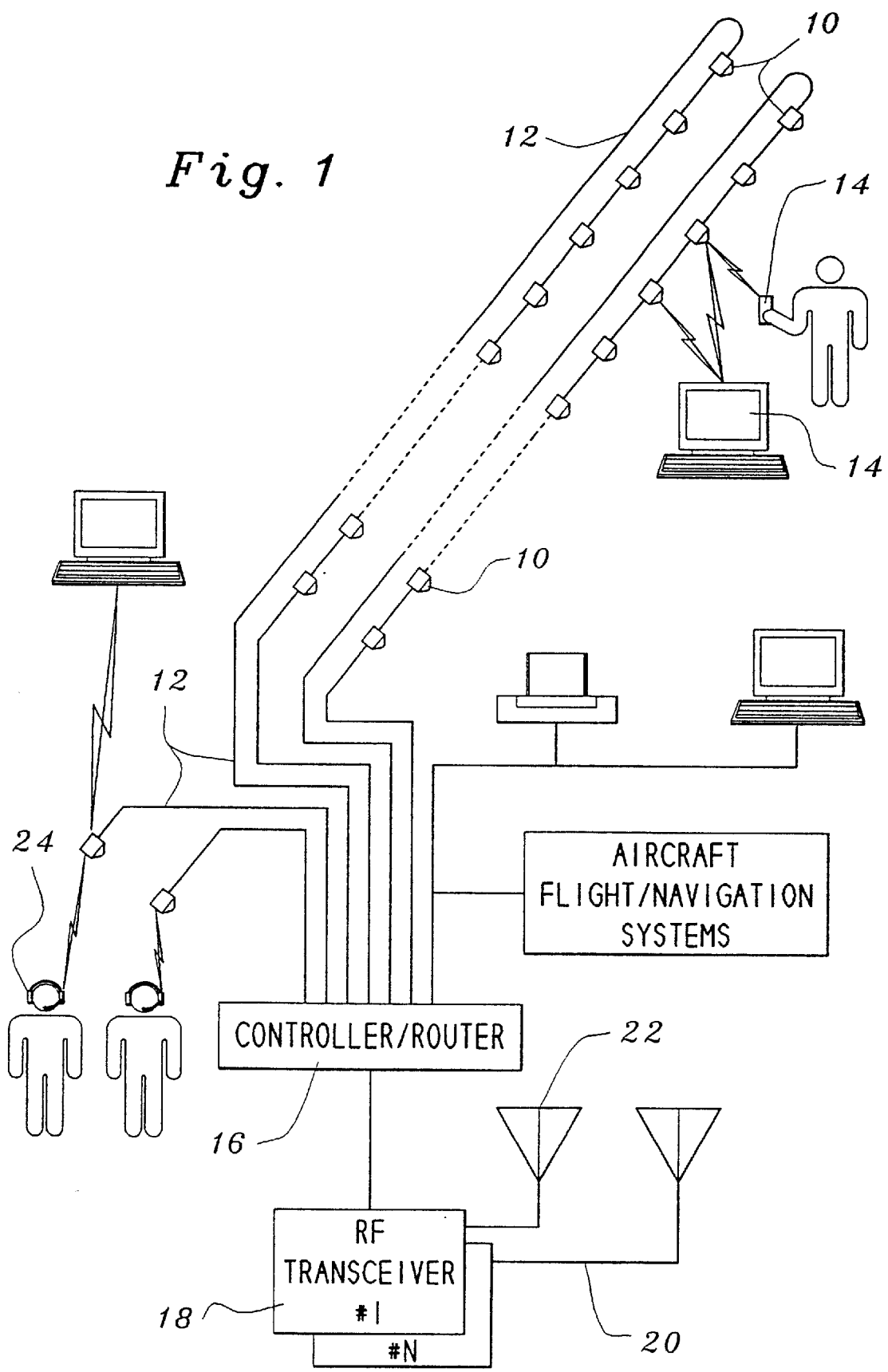
FIG. 1 is a schematic of the invention installed in a passenger aircraft, showing the relationship and connections between optical ports, personal communications devices, controller, RF transceivers, and an RF antenna. The jagged arrows indicate optical-frequency transmissions.

To aid in the correlation of the elements of the invention to the exemplary drawings, the following catalog of the elements is provided:
10 optical port
12 interconnecting cable
14 personal communications device
16 controller/router
18 radio-frequency transceiver
20 radio-frequency cable
22 antenna
24 wireless headphones

DESCRIPTION OF THE PREFERRED EMBODIMENT

Referring now to the drawing, FIG. 1 is a schematic of the invention as installed passenger aircraft. Optical-frequency transmitter/receiver units 10 ("optical ports") are placed at various locations within the cabin, cockpit, and other locations in the aircraft. These units 10 communicate, using optical frequencies, with personal communications devices 14. Major components of the on-board communications network include personal communications devices 14, optical ports 10, interconnecting cable 12 linking the fixed ports, a controller/router 16, radio-frequency transceivers 18 and antenna 22.

"Personal communications devices," as used herein, includes both personal electronic devices belonging to and/or used by passengers, and communications devices used by the aircraft crew members. The latter category also includes devices for transmitting aircraft systems data to interface devices for analysis and use by the flight crew, or for re-transmission to external destinations over conventional RF links. "Data" is used herein to include any information that can be encoded digitally. While the invention is described primarily in terms of infrared frequencies, that being most commonly used in current technology, it is understood that other optical frequencies may be used, including infrared, near-infrared, visible, and/or ultraviolet.

Locations of the optical ports 10 are chosen so that selected areas of the cabin, cockpit, cargo hold and electronics bays are within range of at least one such infrared unit. One suitable location for optical ports 10 in the passenger cabin is the lighted display panel above each group of seats bearing lighted "Fasten Seat Belts" and "No Smoking" warnings. Existing wiring systems in the display panels may provide a readily-accessible source of electrical power for the optical ports, or power may be supplied from another source.

In the cockpit, two or more optical ports 10 provide wireless communication the crew. Wearing headsets 24 having an integral infrared transceiver, the crew is freed from the necessity of having a headset cable plugged into a jack. It is understood that specific and preferred locations for optical ports 10 will vary in different types of aircraft.

Automatic audible alerts or commands from aircraft instrument systems can be wirelessly routed to the crew's headsets. Examples of such alerts are notices that company e-mail is waiting, or that an engine parameter such as oil temperature has exceeded pre-set limits. Such alerts may be spoken, or may be another type of audible alarm.

Referring to FIG. 1, each of the optical ports 10 is interconnected by a wiring harness or assembly, referred to generally as cable 12. This wiring may be in fault-tolerant loops connecting multiple ports as shown, or each port may be on an individual circuit, a daisy-chain arrangement may be used, or other approaches known to those skilled in the art. Cable 12 connects optical ports 10 to a controller/router 16. In one embodiment of the invention, cable 12 carries electronic signals; i.e., input/output of optical ports 10 is an electrical signal. In this embodiment, transmissions at optical frequencies are used only between personal communications devices 14 and the optical ports, with the remainder of the system being electronic. In another embodiment, cable 12 is a fiber-optics cable; the signals transmitted thereon are at optical frequencies. In this latter embodiment, controller 16 includes a converter for converting optical signals to electronic signals and vice versa. Use of optical frequencies for most of the system reduces the chance of electronic interference with other on-board systems. Where fiber-optic cable is used, cable 12 may include electrical conductors to provide power to the optical ports 10.

Some devices which will communicate via the system are hard-wired into the network; i.e., they are on circuits having no optical link. Examples are data terminals, printers, computers, hardwired connections for use by the flight crew, and various monitoring systems which collect data on engine performance and other aircraft systems. Data from these systems is transmitted from the aircraft to ground stations; such transmission may be sent in response to a command from an airline maintenance center. Another system which may be hard-wired into the on-board network are the flight data recorders; transmission of flight recorder data is described below.

From the controller/router 16, one or more circuits connects to one or more RF transceivers 18. More than one type of transceiver may be provided, for differing communication protocols. For example, satellite and ground-based systems often use different frequencies and incompatible protocols; an aircraft over ocean may be able to communicate only via satellite systems, while an aircraft over land can communicate directly with ground stations, usually at lower cost. Transceiver(s) 18 are connected to external antenna(s) 22; communications via the external antennas are RF transmissions. "External antenna," as used herein, refers to an antenna for communication with stations outside the aircraft, regardless of whether the antenna is mounted on the interior or exterior of the aircraft.

Aboard the aircraft, that is, within the cabin and/or cockpit, or within cargo or electronics bays, etc., transmission and reception is via modulated optical-frequency signals. While the preferred embodiment uses infrared frequencies, it is understood that other optical-frequencies corresponding to wavelengths within infrared, near infrared, visible, and ultraviolet portions of the spectrum may be used. Transmission within the aircraft is by means of devices such as light emitting diodes, laser diodes, etc. Reception is via photodecting devices such as photodiodes, PIN photodiodes, etc.

An important feature of the invention is that it allows the optical system to automatically disable the RF capability of personal communications devices 14. Airlines now depend on passengers voluntarily turning off such devices; inevitably, some passengers leave the devices turned on with the transmitters potentially active and responsive to ground systems. According to the present invention, software or firmware in a personal communications device detects the infrared signal, and switches from a radio-frequency mode to an infrared mode. In one embodiment, the infrared system includes at least one "control channel" which is continuously broadcast within the aircraft; detection of an optical control channel causes the personal devices to switch to an infrared mode. Communication then can proceed, but without the deliberate emission of radio frequencies. Automatically disabling RF devices on detection of the infrared system's signal enhances flight safety by eliminating the need for user intervention (turning off certain equipment) to prevent potential interference by RF signals. Responsive to control channel signals, some devices such as laptop computers and other personal computing devices may automatically shut down during critical phases of the flight, especially at lower altitudes.

After switching to the optical (i.e., infrared) mode, a passenger's cellular telephone, PCS telephone, or other communications device can remain passive, or it can register its identity with the on-board system. This latter feature allows user equipment aboard an aircraft to receive calls and data from the ground, or from another aircraft. Most such calls are expected to be voice calls, but also FAX, e-mail, or other data transmissions may be included.

Various types of modulation are suitable for the infrared portion of the system, including amplitude modulation, time modulation, frequency modulation, pulse position modulation, or other types. Aboard passenger aircraft, resource sharing is used to allow multiple users access to the system. Suitable multiple-access techniques include ALOHA, Slotted ALOHA, TDMA, FDMA, CDMA, and others.

Adaptations of currently used RF-related protocols such as EAMPS are also useful as sharing techniques. As a non-limiting example, EAMPS protocol may be transmitted by the on-board IR system. In this scenario, the aircraft portion of the system transmits a control channel that is detected and recognized by various personal communications devices. On initiating a call, a device such as a hand-held telephone optically transmits an FM-modulated signal to one of the optical ports 10 inside the aircraft cabin. Reception by the aircraft portion of the system is via a PIN photodiode or other suitable receiver with suitable bandwidth characteristics. An advantage of this embodiment is that it requires little modification of the telephone other than routing the telephone's transmit and receive signals to an optical port than an RF antenna.

RF antenna 22 may communicate with any of a number of communication facilities. These facilities include both satellite and terrestrial services, such as Iridium, GTE Airfone, AirCell, AT&T, Comsat, Inmarsat, Teledesic, and others. The antenna (or antennas) may be an external blade-type antenna, a patch antenna, or other suitable type.

Information from the flight data recorder and cockpit voice recorder data may be transmitted over the system, in addition to other engine and aircraft performance data. Flight recorders currently in use typically record for a period of about 30 minutes; the oldest voice or data is erased as new voice or data is recorded. In the event of an in-flight emergency, controller/router 16 routes a duplicate of the input to the flight recorders to one or more of the communications system's circuits for live transmission to an external station. This provides a duplicate record, on the ground, of all the data received by the flight recorders, reducing or eliminating the need to quickly recover the flight data recorders from an accident site. In some cases, as an aircraft going down over ocean, such recovery is impossible.

On activation of the emergency mode just described, available remaining RF bandwidth may be used to transmit already-recorded data in addition to the stream of live data. Such transmission of recorded data would be preferably time-reversed, beginning with the most recent data and progressing toward the oldest, to provide the full content of the flight data recorders. Transmission of both real-time and recorded data requires a duplicate feed of recorder data into the controller/router 16. Flight data is stored on disk, in RAM, or in other memory devices within the controller/router, and is retrieved for transmission as required.

Entertainment audio may be transmitted from the optical ports for reception by passenger's headsets. "Entertainment audio" includes movie sound tracks, other audio recordings, and commercial broadcasts. The entertainment audio signal is fed into controller 16 for transmission, via optical ports 10, on a designated channel or channels. Such transmission is a "broadcast" within the confines of the aircraft cabin. For improved music quality, the controller may use greater bandwidth for entertainment audio than for a voice call. Headset reception is via an optical-frequency receiver built into each headset.

The restrictive description and drawings of the specific examples above do not point out what an infringement of this patent would be, but are to enable one skilled in the art to make and use the invention. Various modifications can be made in the construction, material, arrangement, and operation, and still be within the scope of our invention. The limits of the invention and the bounds of the patent protection are measured by and defined in the following claims.

We claim as our invention:

1. A communications system for aircraft, comprising:
    an on-board communications network using optical frequencies for communication inside the aircraft between at least one personal communications device and at least one of a. plurality of optical frequency transmit-receive ports, wherein said at least one personal communications device is selectively operative in one of a radio frequency mode and an optical mode,
    means for disabling the RF mode of the personal communications device in the aircraft cabin in response to an optical control channel within the aircraft,
    one or more antennas for radio-frequency transmission and reception between said on-board communications network and stations outside the aircraft, and means for connecting said on-board network to said antenna.

2. The invention as described in claim 1, said personal communications device further comprising:
    a personal portable communications device responsive in one mode to audio frequencies, and an optical-frequency transceiver adapted for use in said personal portable communications device whereby said personal portable communications device communicates using optical frequencies with said transmit-receive ports.

3. The invention as described in claim 2 wherein the personal portable communications device comprises a personal portable telephone, the invention further comprising a ground-based network with which the personal portable communications device communicates and means for registering the identity of a personal portable telephone with the on-board communications network and the ground-based network, such that calls made to the personal portable telephone from outside the aircraft are received by the antenna and can be directed to the personal portable telephone via the on-board communications network.

4. The invention as described in claim 1, said personal communications device further comprising:
   a personal portable computing device having an optical port, and
   an optical-frequency transceiver adapted for use in said computing device,
   whereby said computing device communicates using optical frequencies with said transmit-receive ports.

5. The invention as described in claim 1, said personal communicates device further comprising:
   at least one wireless headset, operative at optical frequencies, for use by crew members, and
   an optical-frequency transceiver adapted for use in said wireless headset whereby said headset communicates using optical frequencies with said interconnected transmit-receive ports.

6. The invention as described in claim 1, further comprising:
   said transmit-receive ports being located at designated positions within the aircraft,
   a controller, and
   a communications cable connecting said transmit-receive ports to each other and to said controller.

7. The invention as described in claim 6, wherein said communications cable is a fiber-optics cable conveying signals at optical frequencies.

8. The invention as described in claim 6, wherein said controller generates a control channel recognized by personal communications devices on board the aircraft.

9. The invention as described in claim 6, said controller further comprising:
   means for converting optical signals to radio frequencies and for converting radio frequencies to optical signals, and
   means for performing protocol conversions for compatibility between said personal communications device and said transceiver.

10. The invention as described in claim 1, wherein said optical frequencies are within the range of infrared, near-infrared, visible and ultraviolet light.

11. The invention as described in claim 1, said on-board communications network further comprising:
    a controller generating a control channel,
    a communications cable interconnecting said optical ports and said controller,
    a plurality of said optical ports broadcasting said control channel within the aircraft,
    at least one said personal communications device aboard the aircraft communicating at optical frequencies with at least one said optical port,
    for converting between optical frequencies and radio frequencies.
    at least one radio-frequency transceiver connected to said converter, and
    at least one antenna connected to said transceiver for transmitting to and receiving from, at radio frequencies, stations outside the aircraft.

12. The invention as described in claim 1, further comprising:
    means for transmitting engine and aircraft performance data via a portion of said network to a station outside the aircraft.

13. The invention as described in claim 1, further comprising:
    in an emergency condition, means for transmitting flight recorder data via a portion of said network to a station outside the aircraft.

14. The invention as described in claim 1, further comprising:
    means for one-way transmission of entertainment audio within the aircraft via at least one said optical port.

15. The invention as described in claim 1 wherein during an emergency condition the on-board communications network disables use of personal communications devices.

16. The invention as described in claim 1 wherein the aircraft crew disables the use of personal communications devices on the on-board communications network.

17. The invention as described in claim 1 wherein the means for disabling disables the radio frequency mode of the personal communications devices in response to detection of an optical signal.

18. The invention as described in claim 1 wherein the on-board communications network further comprises a control channel periodically transmitting an optical signal, and wherein the means for disabling detects the optical signal and in response thereo disables the radio frequency mode of the personal communications device.

19. The invention as described in claim 1 further comprising a crew communications device selectively operable in a first mode wherein the crew communications device is hardwired to the on-board communications network for providing information signals to and receiving information signals from the on-board communications network, and in a second mode wherein the crew communications device is in optical communications with the on-board communications network for providing information signals to and receiving information signals from the on-board communications network.

20. The invention described in claim 1 further comprising a crew communications device comprising a headset portion and a transceiver portion, wherein the transceiver portion comprises an optical transmitter and receiver for communicating with the on-board communications network, and wherein the headset portion is manually removable from the transceiver portion.

21. The invention described in claim 1 further comprising a crew communications device for sending and receiving information between crew members by way of the on-board communications network.

22. A communications system for an aircraft for providing a communications channel for personal communications devices operable within the aircraft, and for providing a communications link to stations outside the aircraft, comprising:
    a plurality of optical-frequency transmit-receive ports,
    an on-board communications network using optical frequencies for communication inside the aircraft between at least one personal communications device and at least one of the plurality of optical-frequency transmit-receive ports, wherein selected flight information signals are provided by direct connection to said on-board network, an antenna for radio-frequency transmission and reception between said on-board network and a station outside the aircraft, and means for connecting said on-board network to said antenna, and wherein the information conveyed in said flight information signals is transmitted to the station outside the aircraft by said on-board network, and wherein a personal communications device is selectably connected to the station outside the aircraft via said on-board network, and means for disabling the RF mode of the personal communication device inside the aircraft in response to an optical control channel within the aircraft.

23. The invention as described in claim 22 wherein the information signal comprise data related to the performance of one or more aircraft systems.

24. The invention as described in claim 22 wherein the information signal comprises operational information related to the performance of the aircraft engines.

25. The invention as described in claim 22 wherein the information signal comprises flight recorder data provided to the on-board network for transmission to the station outside the aircraft.

26. The invention of claim 25 wherein the flight recorder data is provided to the on-board communications network in real time for immediate transmission to the station outside the aircraft.

27. The invention as described in claim 25 wherein the flight recorder data is provided to the on-board communications network at a first predetermined interval, and wherein the flight recorder data is transmitted to the station outside the aircraft at a second predetermined interval.

28. The invention as described in claim 22 wherein the information signal comprises flight recorder data provided to the on-board network in real time during an emergency condition, and wherein the flight recorder data is immediately transmitted to the station outside the aircraft.

29. The invention as described in claim 22 wherein the information signal comprises cockpit voice recorder information provided to the on-board communications network for transmission to the station outside the aircraft.

30. The invention as described in claim 29 wherein the cockpit voice recorder information is provided to the on-board communications network in real time for immediate transmission to the station outside the aircraft.

31. The invention as described in claim 29 wherein the cockpit voice recorder information is provided to the on-board communications network at a first predetermined interval, and wherein the cockpit voice recorder information is transmitted to the station outside the aircraft at a second predetermined interval.

32. The invention as described in claim 22 wherein the information signal comprises cockpit voice recorder information provided to the on-board network in real time during an emergency condition, and wherein the cockpit voice recorder information is immediately transmitted to the station outside the aircraft.

33. The invention as described in claim 22 further comprising a ground-based facility, wherein the information signal is provided by the on-board network in response to a command issued to the aircraft from the ground-based facility.

34. The invention as described in claim 33 wherein the command causes the cockpit voice recorder information to be provided in real time to the on-board communications network, for immediate transmission to the station outside the aircraft.

35. The invention as described in claim 22 wherein during an emergency condition one or both of the cockpit voice recorder information and the flight recorder data is transmitted to the station outside the aircraft in time-reversed order, such that the most immediate information is transmitted first followed by the information in reverse order of occurrence.

36. The invention as described in claim 22 wherein during an emergency condition one or both of the live cockpit voice recorder information and live flight recorder data is provided to the on-board communications network for real-time transmission to the station outside the aircraft, and wherein recorded cockpit voice recorder information and recorded flight recorder data is provided to the on-board communications network for transmission to the station outside the aircraft in reverse order of occurrence.

37. The invention described in claim 22 wherein the personal communications device is selectably operable in a radio-frequency mode and an optical mode, wherein the personal communications device is operable in a radio-frequency mode outside the aircraft cabin, and wherein operation in the radio-frequency mode is disabled in the aircraft cabin in response to a optical control channel from the on-board communications network.

* * * * *